United States Patent [19]

Gaspar et al.

[11] Patent Number: 4,554,044

[45] Date of Patent: Nov. 19, 1985

[54] COLLATING APPARATUS WITH ADJUSTABLE GEAR

[75] Inventors: Richard A. Gaspar; Donald G. Bastian, both of Centerville; Timothy L. Denlinger, Dayton, all of Ohio

[73] Assignee: Harris Graphics Corporation, Melbourne, Fla.

[21] Appl. No.: 587,093

[22] Filed: Mar. 7, 1984

[51] Int. Cl.⁴ ............................................. B32B 31/18
[52] U.S. Cl. .................................... 156/510; 156/252; 156/253; 156/513; 156/516; 83/324; 282/11.5 A
[58] Field of Search ............... 156/252, 253, 510, 513, 156/516; 282/11.5 A, 11.5 R, 12 A, 12 R, 15 A, 282/15 B, 16 A, 16 B, 16 C; 83/324

[56] References Cited

U.S. PATENT DOCUMENTS

| | | | |
|---|---|---|---|
| 3,369,436 | 2/1968 | Loase | 83/324 |
| 4,333,372 | 6/1982 | Muylle et al. | 83/324 |
| 4,426,242 | 1/1984 | Sarkans et al. | 156/516 |

Primary Examiner—Caleb Weston
Attorney, Agent, or Firm—Biebel, French & Nauman

[57] ABSTRACT

A collating apparatus having a collating unit, a perforating unit and a fan-folding unit, all gear driven by a single main drive gear, and having a gear assembly driven by the drive gear which includes a gear having an adjustable rotational eccentricity and an adjustable phase of eccentricity relative to the other gears. In a preferred embodiment, the adjustable gear includes an inner hub mounted on a rotatable shaft, an intermediate hub having an eccentric bore rotatably receiving the inner hub, a gear ring having an eccentric bore rotatably receiving the intermediate hub and a clamp bar attached to the gear ring and to the shaft. The bar includes an adjustment mechanism for varying the orientation of the gear ring, intermediate hub and inner hub relative to each other. By adjusting the rotational eccentricity of the gear ring and the phase of the eccentricity, the adjustable gear can compensate for eccentricities inherent in other gears of the apparatus so that the collating, perforating and folding units operate synchronously.

7 Claims, 10 Drawing Figures

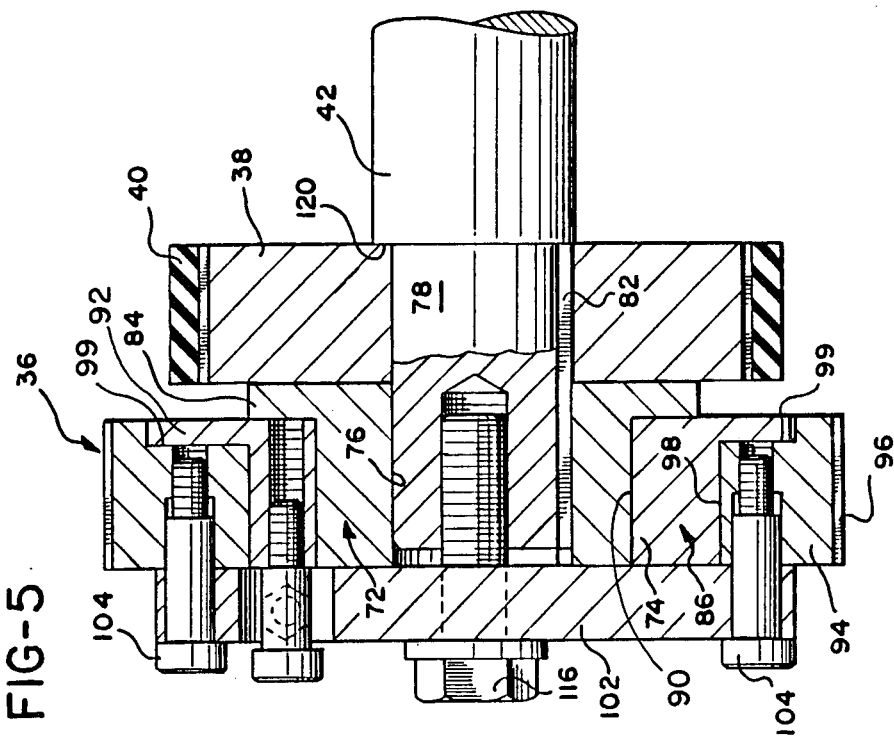
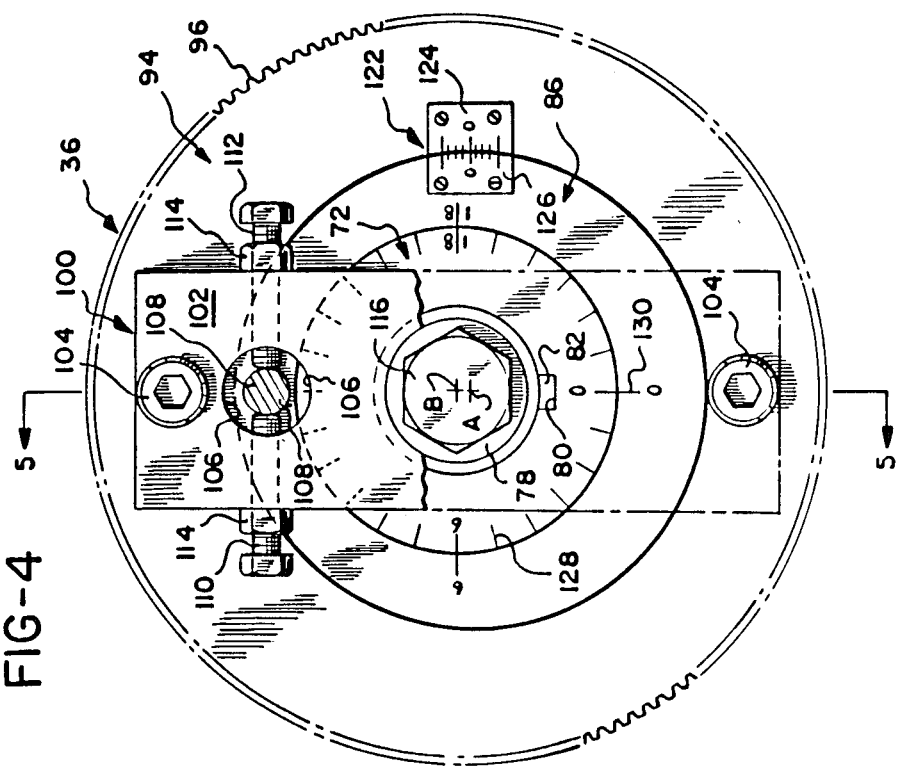

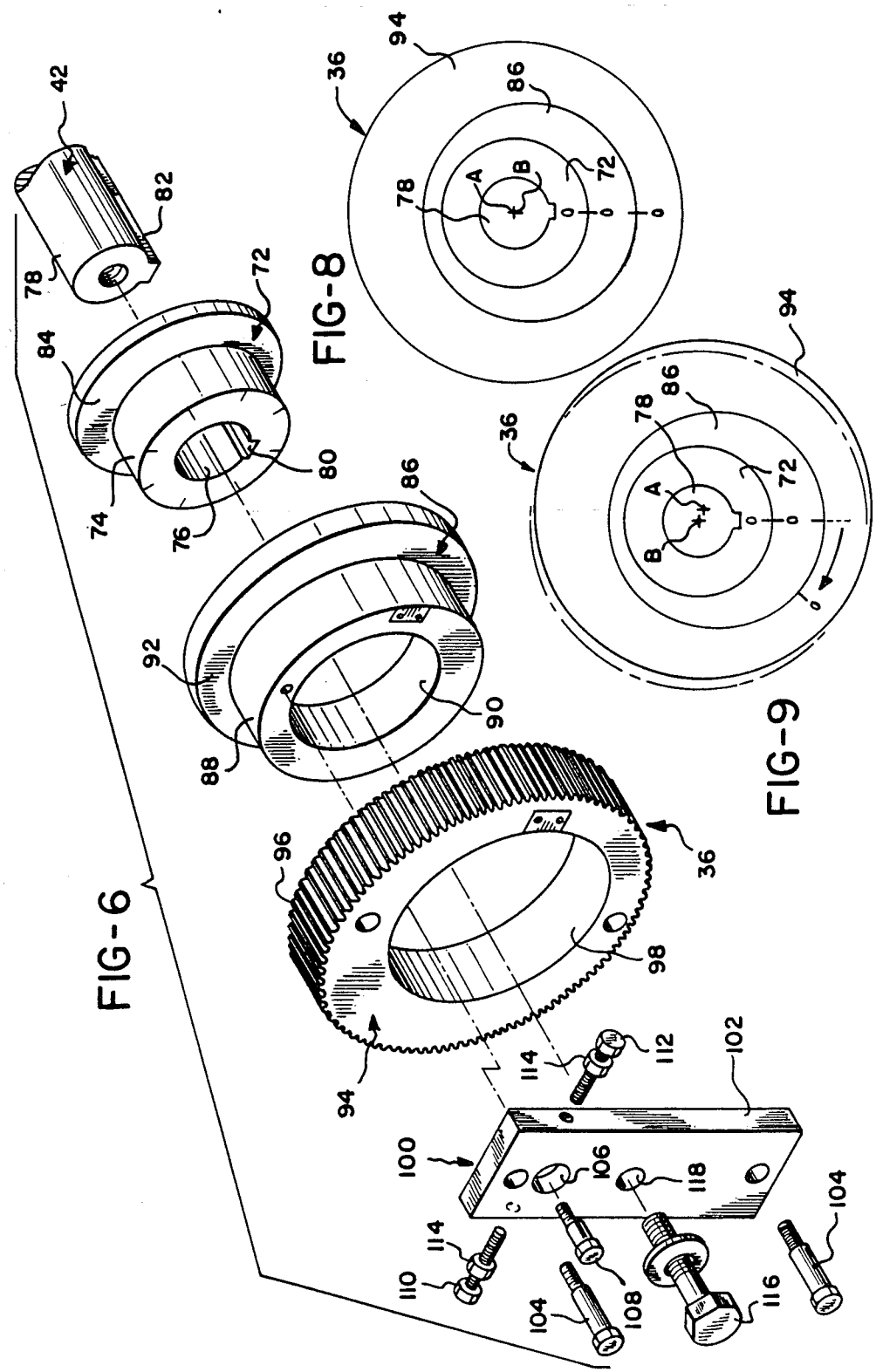

COLLATING APPARATUS WITH ADJUSTABLE GEAR

BACKGROUND OF THE INVENTION

The present invention relates to apparatus for handling webs of material and, more particularly, apparatus for collating a plurality of webs of material, forming regularly spaced cross perforations on the collated webs, and folding the perforated webs at the perforations.

A recurring problem with such collators is the synchronization of the various units performing the successive operations, particularly in producing business forms. This type of apparatus includes a collating unit in which a plurality of webs of material are unwound from rolls and are glued or otherwise attached to each other in overlapping relation to make continuous forms.

The collated webs are conveyed to a cross perforating unit and passed between a pair of driven cylinders or rolls, one of which is fitted with transverse perforating knives. The perforating roll typically includes a single pair of knives placed at diametrically opposite positions about its circumference, and the rolls are sized such that the circumferential distance between the knives equals the desired spacing between successive cross perforations on the collated webs. After passing between the rolls, the collated web enters a folding unit which folds the web at the transverse rows of perforations and forms a vertical, fan-folded stack.

In order to minimize the materials and labor costs involved in constructing such devices, it is desirable to drive all of the units from a single source. Typically, a variable speed electric motor rotates a main drive gear which is connected to and drives the collator, perforator and folder units by a series of intermeshing gears and pulley and timing belt combinations. As a result of the manufacturing tolerances for the gears used in these devices, the bore in such a gear which receives the mounting shaft is slightly offset from the center of the gear. The periphery or pitch circle of the gear will then have a geometric center which is spaced slightly from the center of rotation of the shaft upon which the gear is mounted, thereby introducing an eccentricity into the rotation of that gear.

In some instances, the eccentricities of gears in a gear train are oriented in substantially the same phase relative to each other so that they become additive and the resultant eccentricity of the gear train noticeably effects the synchronization of a particular unit relative to the other units of the apparatus. Most commonly, a large resultant eccentricity in a gear train causes the linear speed of the collated webs entering the perforator to vary relative to the speed at which the perforating cylinders rotate. Conversely, a large resultant eccentricity may affect the performance of the perforator such that the perforating knives do not rotate at a constant tangential speed.

The result for either deviation is a cyclical variance in the spacing between transverse rows of perforations. This results in the formation of stacks having folded sheets of a cyclically varying length so that a column of such sheets has a perceptible sinusoidal shape on its front and rear sides formed by rows of overlying perforations. Such a stack is undesirable not only from an aesthetic standpoint, but from a practical standpoint in that such stacks of folded sheets are often difficult or impossible to load into a box dimensioned to receive a column of sheets having a relatively nonvarying length.

Attempts have been made to eliminate or compensate for the eccentricities inherent in the gears of gear trains in such collating apparatus. For example, a common practice is to reposition selected gears at random relative to other gears in the gear train with the goal of orienting the repositioned gears such their eccentricities are out of phase with the eccentricities of the other gears and, therefore, would cancel them. This method is extremely time-consuming and, since the eccentricities are not visually perceptible, the proper selection and positioning of gears is left to chance.

Another attempted solution to this problem is to provide gear trains with a relatively large number of meshing gears so the large number of individual gear eccentricities, when added together, will substantially cancel each other and the components of the apparatus are sufficiently synchronous to provide an acceptable stack of folded sheets. The disadvantage with this solution is that there is no assurance of a successful arrangement of gears, and the inclusion of such a large number of gears increases the cost of manufacturing and maintaining such apparatus.

A different solution is described in the Loase U.S. Pat. No. 3,369,436, issued Feb. 20, 1968, to the assignee of this application. That patent discloses an apparatus for processing a web of material which includes a pair of perforating rolls in which an upper roll includes an adjustable gear mounted on its supporting axle. The adjustable gear includes a hub which receives the axle through an eccentric bore and an outer gear ring which receives the hub through an eccentric bore.

The gear ring and hub are adjustable relative to each other such that an eccentricity of predetermined magnitude may be introduced into the rotation of that gear to compensate for eccentricities in other gears with which it meshes so that the rotational speed of the perforating roll to which it is attached matches the varying linear speed of the web which it engages. A disadvantage with such a gear is that it is keyed onto the axle on which it is mounted and lacks means for changing the phase of that gear to compensate for eccentricities having different phases.

Accordingly, there is a need for a collating apparatus in which the various units can be synchronized to compensate for eccentricities occurring in the gears driving the units to eliminate sinusoidal or cyclical variations in the finished stack of forms. Such a collating apparatus should be capable of on-site adjustment to eliminate such asynchronous operation of units, and the means of adjustment should be relatively simple and economical to operate.

SUMMARY OF THE INVENTION

The present invention is a collating apparatus of the type having a collating unit, a perforating unit and a folding unit which receive power from a single source through a gear train driven by a single main drive gear. The gear train includes an adjustable gear in which an eccentricity of a predetermined magnitude may be introduced into that gear at a predetermined phase relative to the other gears in the gear train. Through a relatively simple operation, the eccentricity and its phase can be adjusted to compensate for and thereby negate the resultant eccentricities of the other gears in the gear train so that the units of the apparatus operate substantially synchronously.

In a preferred embodiment, the adjustable gear is mounted on a rotatable shaft and includes an inner hub keyed onto the shaft having a cylindrical outer surface, an intermediate hub having a cylindrical outer surface and an eccentric bore shaped to receive the inner hub, and a ring gear having an eccentric bore shaped to receive the intermediate hub. The inner hub is rotatable relative to the intermediate hub, and the intermediate hub is rotatable relative to the ring gear. The hubs and ring gear are held in position by a clamp bar which is fixed at its upper and lower ends to the ring gear and is positioned to extend diametrically across the ring gear. A mounting screw extends through the clamp bar and is threaded into the end of the shaft. The gear is clamped by the mounting screw against a spacer, such as a pulley, which is seated against an annular shoulder formed on the shaft.

The clamp bar includes a hole superposed to the intermediate hub, and the intermediate hub includes an adjusting screw which extends outwardly through the hole. The adjusting screw is shaped to form a clearance with the hole so that a slight relative rotational movement between the intermediate hub and ring gear is possible. A pair of opposing locking screws are threaded into the clamp bar such that they may be displaced to protrude into the hole and contact the adjusting screw. By selective displacement of the locking screws, the relative position of the adjusting screw within the hole, and hence the position of the intermediate hub relative to the ring gear, may be adjusted.

To impart an eccentricity to the adjustable gear, the intermediate hub is rotated relative to the ring gear by selective displacement of the adjusting screw within the hole in the clamp bar by the locking pins. This causes the axis of rotation of the gear, which is the geometric center of the inner hub, to be shifted slightly from the geometric center of the ring gear, thereby creating an eccentric rotational movement of the adjustable gear. The phase of the eccentricity is adjusted by loosening the mounting bolt in the clamp bar and rotating the ring gear and intermediate hub relative to the inner hub. By imparting an eccentricity to the adjustable gear and adjusting the phase of the gear, an eccentricity which counteracts the cumulative eccentricities of the other gears in the gear train can be formed so that the various units of the collating apparatus operate substantially synchronously.

Accordingly, it is an object of the present invention to provide a collating apparatus of the type in which a single source of rotational power is capable of operating a plurality of units in substantially synchronous fashion; a collating apparatus which produces fan-folded sheets of collated webs in a vertical stack having minimal variations in length from sheet to sheet; and a collating apparatus in which the eccentricities of the gears in the gear assembly can be compensated for relatively easily and without disassembling the apparatus.

Other objects and advantages of the invention will become apparent from the following description, the accompanying drawings and the appended claims.

BRIEF DESCRIPTION OF THE DRAWINGS

FIG. 4 is a front elevational view of the adjustable gear shown in FIG. 1 in which the clamp plate is partially broken away;

FIG. 5 is a side elevation in section of the gear of FIG. 4 taken at line 5—5 of FIG. 4;

FIG. 6 is an exploded perspective view of the adjustable gear of FIG. 1;

FIG. 8 is a schematic front elevation of the gear of FIG. 1 adjusted for substantially no eccentricity;

FIG. 9 is a schematic, front elevation of the gear of FIG. 8 adjusted to provide eccentric rotation.

DETAILED DESCRIPTION OF THE PREFERRED EMBODIMENT

Figure 1:
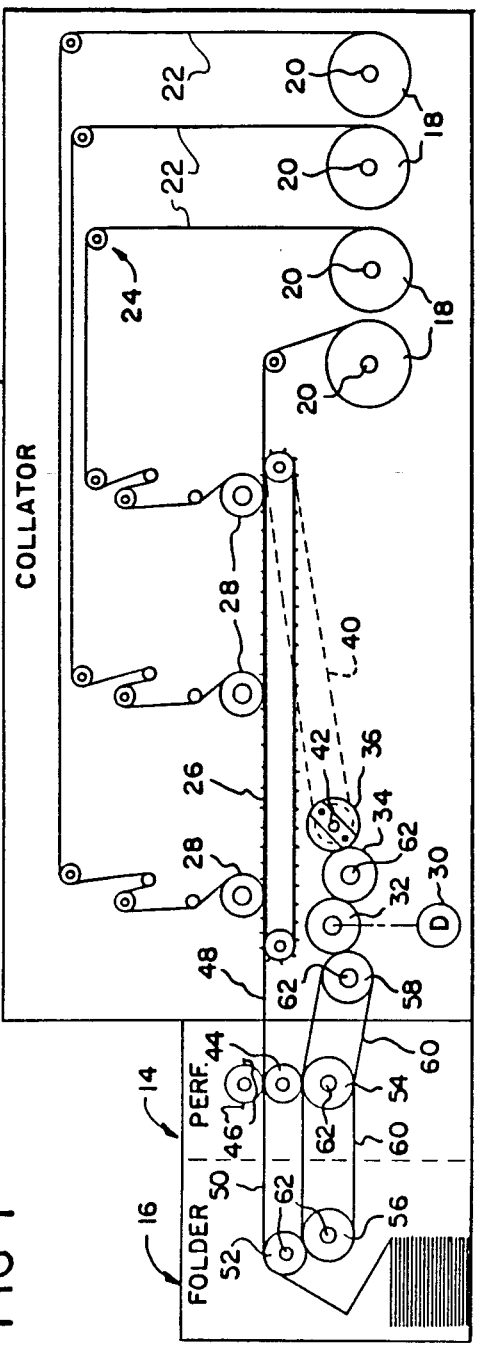
FIG. 1 is a schematic side elevation of a collating apparatus showing a preferred embodiment of the invention.

As shown in FIG. 1, a collating apparatus embodying the present invention includes a collator unit, generally designated 12, a perforator unit, generally designated 14, and a folder unit, generally designated 16. In the collator unit 12, a plurality of rolls of webs 18 are mounted on spindles 20, and webs 22 unwound from the rolls travel through a system of rollers 24 to be positioned in overlapping relation on a pin conveyor 26. The webs 22 are glued together in overlapping relation by a glue system (not shown) associated with the rollers 28 that engage the pin conveyor 26.

A variable speed electric motor 30 is operatively connected to a main drive gear 32. Main drive gear 32 meshes with an idler gear 34 that meshes with an adjustable gear 36. The adjustable gear 36 drives a pulley 38 (FIG. 5) which is operatively connected to the pin conveyor 26 by a timing belt 40. The adjustable gear 36 and pulley 38 are mounted on a shaft 42 which rotates with the gear and pulley to drive other well-known components (not shown) of the collator 12.

The perforator unit 14 includes a pair of meshing perforator cylinders 44, the upper one of which includes diametrically opposing, transverse knives 46. The perforator unit 14 receives the collated web 48 from the collator unit 12 and imparts spaced transverse rows of perforations on the web as it passes between the cylinders 44.

The collated and perforated web 50 passes into the folder unit 16 where a mechanism, represented schematically by gear 52, fan-folds or "zig-zag" folds the web 50 at the rows of perforations along its length. The perforator cylinders 44 mesh with gear 54, and the gear 52 driving the folder apparatus meshes with gear 56. Gears 54 and 56 are operatively connected with an idler gear 58 by belts 60, so that the single main drive gear 32 is capable of operating the entire collator apparatus. The general arrangement and design of the collator unit 12, perforator unit 14 and folder unit 16 are well-known in the art.

The gears of the collator unit 12, perforator unit 14 and folder unit 16 are mounted on axles 62 and, due to variable tolerances inherent and unavoidable in their manufacture, are mounted somewhat eccentrically so that their centers of rotation are spaced slightly from the geometric centers of their peripheries of pitch lines. As a result of these eccentricities, at any given moment during operation of the collating apparatus, a unit may be operating at a linear speed which exceeds or falls below the linear speeds of the other units. For example, during operation of the collating apparatus, the rate at which the perforator cylinders 44 are rotated by gear 54 may vary cyclically, resulting from an eccentricity of gear 54, relative to the linear speed of the collated web 48 leaving the collator unit 12. This causes the perforations made by blades 46 to vary cyclically in distance from each other as the upper perforator cylinder 44 varies in speed relative to the web 48.

Figure 2:
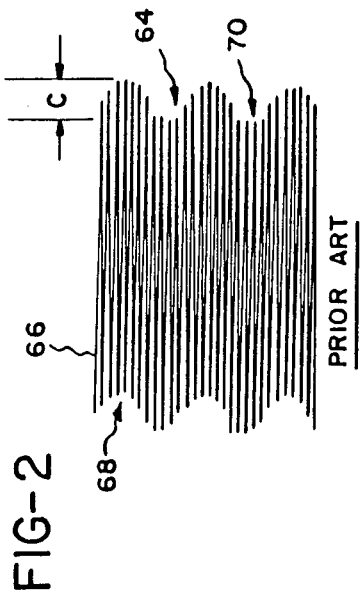
FIG. 2 is a schematic representation of a column of fan-folded forms produced by a prior art apparatus having units operating non-synchronously, or by the apparatus of FIG. 1 before adjustment.

When the folder unit 16 folds the collated and perforated web 50 at the transverse rows of perforations, sheets of finished forms having cyclically varying lengths are formed. As shown in FIG. 2, when folded by unit 16, a stack 64 is formed. Although greatly exaggerated, the lengths of the individual sheets 66 vary such that the front and rear faces 68, 70 of the stack 64 take on a sinusoidal profile. The eccentricities of the gears 32, 34, 54, 56 and 58 can be compensated for and their effect substantially eliminated by the adjustable gear 36.

As shown in FIGS. 4, 5 and 6, the adjustable gear 36 includes an inner hub 72 having a cylindrical outer surface 74 and a bore 76 concentric with the outer surface. The bore 76 is sized to receive the end 78 of the shaft 42 therethrough and includes a key slot 80 which engages the key 82 on the shaft 42. The inner hub 72 also includes an annular flange 84 extending outwardly from an inboard portion thereof and abutting the pulley 38.

An intermediate hub 86 includes a cylindrical outer surface 88 and a bore 90 extending therethrough and oriented eccentrically with respect to the outer surface. The bore 90 is sized to receive the cylindrical outer surface 74 of the inner hub 72 with sufficient clearance to allow relative rotation. The intermediate hub 86 includes an annular flange 92 extending outwardly from an inboard portion and which abuts the flange 84 of the inner hub 72.

The adjustable gear 36 includes a gear ring 94 having a toothed, cylindrical outer periphery 96 and a bore 98 therethrough positioned eccentrically with respect to the outer surface. The intermediate hub 86 is fitted for relative rotational movement within the bore 98 of the gear ring 94. Gear 94 includes an annular recess 99 which receives flange 92 of the intermediate hub 86 (FIG. 5). Gear ring 94 can also comprise a split gear of well-known design, to prevent backlash, if desired.

Both bore 90 in intermediate hub 86 and bore 98 in gear ring 94 are circular and are eccentric in that their geometric centers are spaced slightly from the geometric centers of the cylindrical portions 88, 96 of the intermediate hub and gear ring, respectively. For example, in one actual application of the adjustable gear 36, a gear ring having a diameter of 7.837 inches included a bore having a diameter of 4.990 inches and positioned such that the center of the bore was offset 0.125 inches from the center of the gear. The intermediate hub was sized to fit within the bore of the gear ring and itself included a circular bore whose center was offset from the center of the hub by 0.125 inches.

The inner hub 72, intermediate hub 86 and gear ring 94 are fixed relative to each other and are mounted on the shaft 42 by a clamp bar assembly, generally designated 100. The clamp bar assembly 100 includes an oblong clamp bar 102 which extends across the gear ring 94 diametrically and is attached thereto at its upper and lower ends by cap screws 104. The clamp bar 102 includes a hole 106 which is superposed to the intermediate hub 86. An adjusting screw 108 is threaded into the intermediate hub 86 and extends outwardly therefrom through the hole 106. The adjusting screw 108 and hole 106 are sized such that there is a clearance between them which allows for the relative movement of the adjusting screw and clamp bar 102.

A pair of opposing locking screws 110, 112 are threaded into opposite sides of the clamp bar 102 such that their ends protrude into the hole 106 and abut the adjusting screw 108. The position of the locking screws 110, 112 is fixed relative to the clamp bar 102 by nuts 114 which may be tightened against the sides of the bar.

The clamp bar 102 is held against the end 78 of the shaft 42 by a mounting screw 116 which extends through a central hole 118 in the bar and is threaded into the end of the shaft. The shaft 42 includes an annular shoulder 120 against which the pulley 38 is seated. By tightening the mounting screw 116 against the shaft end 78, the adjustable gear 36 and pulley 38 are clamped against the shoulder 120 so that there is no relative movement between the gear, pulley and shaft when the screw 116 is tightened.

Figure 7:
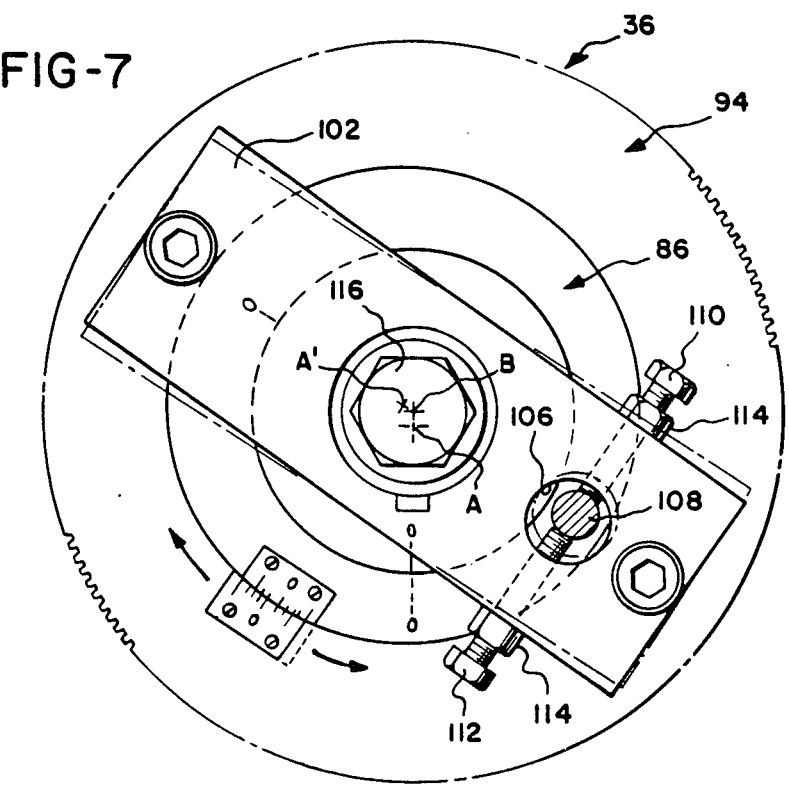
FIG. 7 is a somewhat schematic, front elevational view of the adjustable gear of FIG. 1 showing the relative movement between the ring gear, intermediate hub and inner hub.

To adjust the eccentricity of the adjustable gear 36, it is first necessary to loosen the mounting screw 116 to introduce play between the gear and the end 78 of shaft 42. Then, as best shown in FIGS. 4 and 7, the locking nuts 114 are backed away from the sides of the clamp bar 102, thereby allowing the locking screws 110, 112 to be adjusted. The locking screws 110, 112 are then displaced relative to the clamp bar 102, thereby displacing the adjusting screw 108 within the hole 106. Displacement of the adjusting screw relative the hole 106 and clamp bar 102 effects a rotation of the gear ring 94 relative to the intermediate and inner hubs 86, 72, respectively.

As a result of the eccentric locations of the intermediate and inner hubs 86, 72, respectively, relative to the outer surface 96 of the gear ring 94, this rotation acts to displace the geometric center of the gear ring, represented by point A, from the geometric center of the inner hub 72, represented by point B, the latter point at all times colinear with the axis of rotation of shaft 42 (see FIG. 4). It should be noted that rotation of the gear ring 94 relative to the intermediate and inner hubs 86, 72 can be made in either a clockwise or in a counterclockwise direction, depending upon the adjustment made to the locking screws 110, 112. After the desired rotation of the gear ring 94 has been effected, the locking nuts 114 are once again tightened against the sides of the clamp bar 102, and the mounting screw 116 tightened against the clamp bar.

To adjust the phase of such an eccentricity relative to the other gears of the collating apparatus (see FIG. 1), the mounting screw 116 is again loosened from the shaft end 78. However, with this adjustment the clamp bar is left undisturbed and the gear ring and intermediate hub 94, 86, respectively, are rotated in a clockwise or counterclockwise direction relative to the inner hub 72. Since the outer surface 74 of the inner hub 72 is concentric with the shaft end 78, the rotation of the intermediate hub and gear ring 86, 94 does not vary the eccentricity but merely shifts its position.

As shown in FIG. 7, a rotation of the gear ring 94 and intermediate hub 86 through an angle of approximately 135° shifts the location of the center of the gear ring 94 from point A to point A'. After this phase rotation has been effected, the mounting screw 116 is again tightened against the shaft end 78.

In order to aid an operator in the adjustment of the eccentricity of the adjustable gear 36, a scale 122 is provided having a portion 124 attached to the gear ring 94 and a portion 126 attached to the intermediate hub 86. Similarly, in order to aid an operator in adjusting the phase of an eccentricity, the inner hub 72 is provided with regularly spaced marks, generally designated 128, and the intermediate hub 86 is provided with corresponding marks, generally designated 130.

Figure 10:
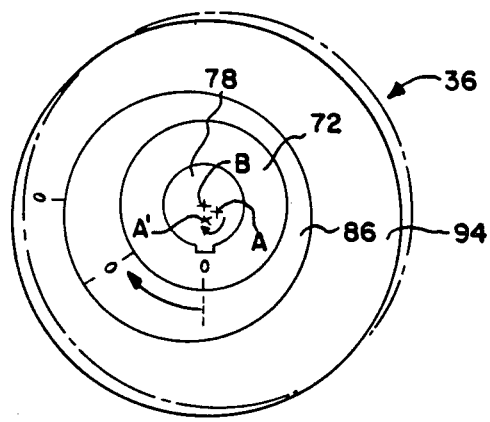
FIG. 10 is a schematic, front elevation of the gear of FIG. 9 rotated to show a change in phase of the eccentricity.

The effect of the adjustments in the eccentricity and phase of the adjustable gear 36 are more readily apparent in FIGS. 8, 9 and 10 in which the eccentric positioning of the units of the adjustable gear are exaggerated. FIG. 8 shows the adjustable gear 36 adjusted so that there is substantially no eccentricity. In this configuration, the center of the gear ring 94, represented by point A, is coincident with the axis of rotation B of the shaft end 78. This is the configuration of the adjustable gear when first mounted on a collating apparatus of the type shown in FIG. 1 and prior to adjustment.

As shown in FIG. 9, rotation of the gear ring 94 relative to the intermediate hub 86, inner hub 72 and shaft end 78 causes the geometric center A of the gear ring to be displaced from the axis of rotation B of the shaft end 78. As shown in FIG. 10, a rotation of the gear ring 94 and intermediate hub 86 relative to the inner hub 72 and shaft end 78 causes the center of the gear ring to move to point A' from point A. The axis of rotation remains at point B.

The procedure for adjusting the collating apparatus shown in FIG. 1 to eliminate the formation of the stack 64 shown in FIG. 2 is as follows. When the collating apparatus is assembled at the job site, the adjustable gear 36 is mounted on its shaft 42 and is adjusted to a position of zero eccentricity, as shown schematically in FIG. 8. The collating apparatus is then loaded with rolls 18 of coiled webs and a preliminary run is made. Should the folded stack of forms resulting from the operation of the collating apparatus in this position be unacceptably wavy, the gear 36 is adjusted to impart a predetermined eccentricity into the gear train and the collator operated to produce a second test run of folded forms.

Figure 3:
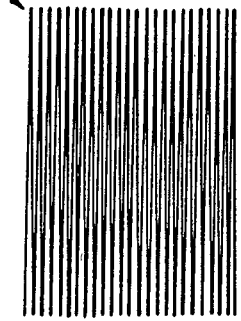
FIG. 3 is a schematic representation of a column of fan-folded forms produced by the embodiment shown in FIG. 1 after adjustment.

If the resultant stack is still unacceptably wavy, the phase or orientation of the eccentricity of the adjustable gear 36 is adjusted with respect to the other gears of the gear train by rotating the gear ring 94 and intermediate hub 86 in the manner previously described. Rotation of the gear in a clockwise and in a counterclockwise direction should be tried to determine the optimum orientation of the gear. The resultant stack should be similar to the stack 132 shown in FIG. 3 in which there is only a very slight waviness to the column.

The following tests were performed on a Harris Model 505 collator utilizing an adjustable gear 36 mounted as shown in FIG. 1. The stack amplitude is the distance C in inches shown in FIG. 2 from the peak to the valley of a wave along a wavy side of a column 64 of folded forms. The eccentricity, measured in inches, represents the distance the geometric center A is spaced from the center of rotation B of the shaft 42 on which the gear is mounted. The phase angles simply represent the number of degrees the gear ring 94 and intermediate hub 86 are rotated in a clockwise ("CW") or counterclockwise ("CCW") direction from their orientation when mounted on the shaft 42.

| Run No. | TEST NO. 1 | | | | |
|---|---|---|---|---|---|
| | 1 | 2 | 3 | 4 | 5 |
| Phase | 0° | 0° | 45° CW | 45° CW | 45° CW |
| Eccentricity | 0 | 0.007 | 0.007 | 0.010 | 0.005 |
| Stack Amplitude | 0.085 | 0.030 | 0.015 | 0.050 | 0.010 |

It should be noted that a stack amplitude C of 0.015 inches or less is acceptable in the art.

In Test 2, the adjustable gear was removed from its location as shown in FIG. 1 and mounted on the shaft 62 of the perforation unit 14 of the collating apparatus. A substitute gear of conventional design (not shown) was mounted on shaft 42. The results of operation with this configuration are as follows.

TEST NO. 2

| Phase | 1 | 2 | 3 | 4 | 5 | 6 | 7 | 8 | 9 |
|---|---|---|---|---|---|---|---|---|---|
| Phase | 0° | 0 | 180° CW | 135° CW | 135° CCW | 180° CCW | 165° CW | 30° CW | 205° CW |
| Eccentricity | 0 | 0.010 | 0.010 | 0.010 | 0.010 | 0.006 | 0.006 | 0.006 | 0.005 |
| Stack Amplitude | 0.075 | 0.215 | 0.055 | 0.065 | 0.180 | 0.020 | 0.035 | 0.025 | 0.015 |

While the form of apparatus herein described constitutes a preferred embodiment of the invention, it is to be understood that the invention is not limited to this precise form of apparatus, and that changes may be made therein without departing from the scope of the invention.

What is claimed is:

1. In a collating apparatus of the type including collating means for unwinding webs from a plurality of rolls mounted on spaced spindles and joining the webs in overlapping relation, perforating means for receiving joined webs from said collating means and forming uniformly spaced cross perforations thereon, and folding means for receiving joined and perforated webs from said perforating means and fan folding the webs at certain cross perforations thereon, said apparatus including a main drive gear and gear means, meshing with and driven by said main drive gear, and connected to said collating means, said perforating means and said folding means, said gear means having an improved adjustable gear comprising:

a support shaft rotatably mounted on said collating apparatus;

a cylindrical inner hub having a bore therethrough concentric with a periphery thereof and adapted to receive said shaft therethrough in nonrotatable engagement therewith;

a cylindrical intermediate hub having a bore therethrough eccentrically positioned relative to said intermediate hub and shaped to receive said inner hub in rotatable engagement therewith;

a gear ring having a substantially circular periphery and a hole therethrough eccentrically positioned relative to said gear ring periphery and shaped to receive said intermediate hub in rotatable engagement therewith; and clamp means attached to said gear ring, releasably attached to said shaft, and adjustably attached to said intermediate hub such that
  (a) said gear ring may be rotated relative to said intermediate hub by adjustment of said adjustable attachment to displace a geometric center of said gear ring periphery from an axis of rotation of said shaft and thus to impart a predetermined eccentricity to said adjustable gear, and
  (b) said intermediate hub may be rotated relative to said inner hub by adjustment of said releasable attachment to selectively vary a phase orientation of said predetermined eccentricity relative to said main drive gear and the remainder of said gear means, thereby compensating for inherent eccentricities therein.

2. The apparatus of claim 1 wherein said clamp means comprises a clamp bar positioned diametrically across said gear ring and attached thereto at upper and lower ends thereof; a mounting screw threaded through a center of said shaft; and means for displacing said gear ring relative to said intermediate and inner hubs.

3. The apparatus of claim 2 wherein said displacing means comprises said clamp bar having a hole therethrough superposed to said intermediate hub; adjusting screw means threaded into said intermediate hub, extending through said superposed hole and sized to provide clearance between said adjusting screw means and said clamp bar; and locking bolt means threaded through said clamp bar and contacting said adjusting screw means such that displacement of said locking bolt means fixes said adjusting screw means at a predetermined position within said superposed hole to rotate said intermediate hub relative to said gear ring.

4. The apparatus of claim 3 wherein said shaft includes shoulder means formed thereon and spaced from an end thereof; and said adjustable gear includes spacer means seated on said shoulder means and adjacent to said inner hub such that said mounting screw may be tightened against said clamp bar to clamp said adjustable gear against said shoulder means.

5. The apparatus of claim 4 wherein said spacer means comprises a pulley drivingly engaged to a corresponding pulley in said gear means.

6. The apparatus of claim 5 wherein said inner hub includes a flange extending about an inboard portion thereof such that an inner face thereof abuts said pulley and an outer face thereof abuts said intermediate hub.

7. In a collating apparatus of the type including collating means for unwinding webs from a plurality of rolls mounted on spaced spindles and joining the webs in overlapping relation, perforating means for receiving joined webs from said collating means and imparting uniformly spaced rows of perforations thereon, and folding means for receiving joined and perforated webs from said perforating means and fan-folding joined and perforated webs at rows of perforations thereon, said apparatus including a main drive gear and gear means, meshing with and driven by said main drive gear, and connected to said collating means, said perforating means and said folding means, said gear means having an improved adjustable gear assembly comprising:

a support shaft rotatably mounted on said collating apparatus and including a longitudinally extending key thereon and an annular shoulder spaced inwardly from an end thereof;

a spacer pulley mounted on said shaft and abutting said shoulder and including a key slot for receiving said key;

an inner hub having a cylindrical outer surface, a bore concentric with said outer surface thereof and shaped to receive said shaft therethrough and including a key slot for receiving said key, and an annular flange extending from an inboard portion thereof and abutting said spacer pulley;

an intermediate hub having a cylindrical outer surface, a bore eccentrically positioned relative to said outer surface thereof and receiving said inner hub in rotatable engagement therewith, and an annular flange extending from an inboard portion thereof and seated on said inner hub flange;

a gear ring having a toothed, cylindrical outer surface, a bore eccentrically positioned relative to said outer surface thereof and receiving said intermediate hub in rotatable engagement therewith and including an annular recess on an inboard side thereof shaped to seat said intermediate hub flange; and clamp means including a clamp bar extending diametrically across said gear ring and attached thereto at opposite ends of said bar, a mounting screw extending through said bar and threaded into said support shaft end, thereby clamping said gear assembly against said shaft shoulder, said bar having a hole superposed to said intermediate hub, adjusting screw means threaded into said intermediate hub and extending through said superposed hole and sized to provide clearance between said adjusting screw means and said clamp bar, and a pair of opposing locking bolts threaded through said clamp bar and contacting said adjusting screw means such that displacement of said locking bolt means fixes said adjusting screw means at a predetermined position within said superposed hole to rotate said intermediate hub relative to said gear ring.

* * * * *